Oct. 20, 1970   R. B. HOOK ETAL   3,534,604
WATERMETER WITH FREEZE PROTECTION AND INDICATION
Filed Feb. 8, 1968   3 Sheets-Sheet 1
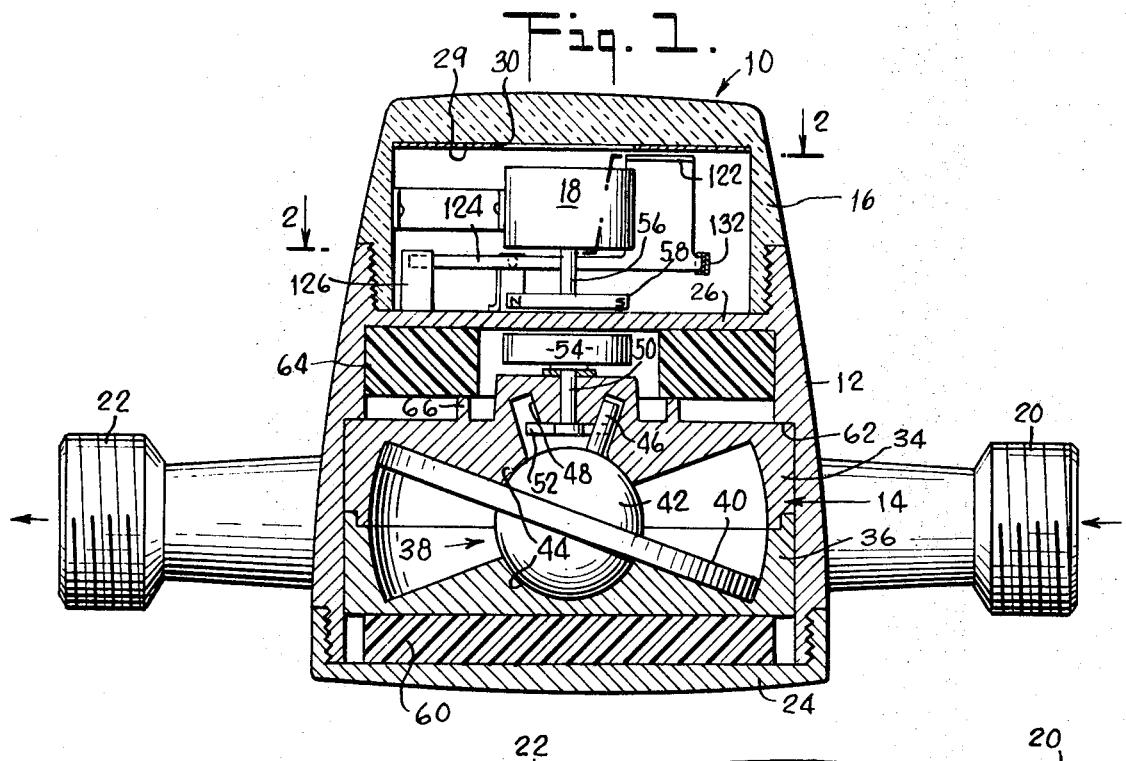
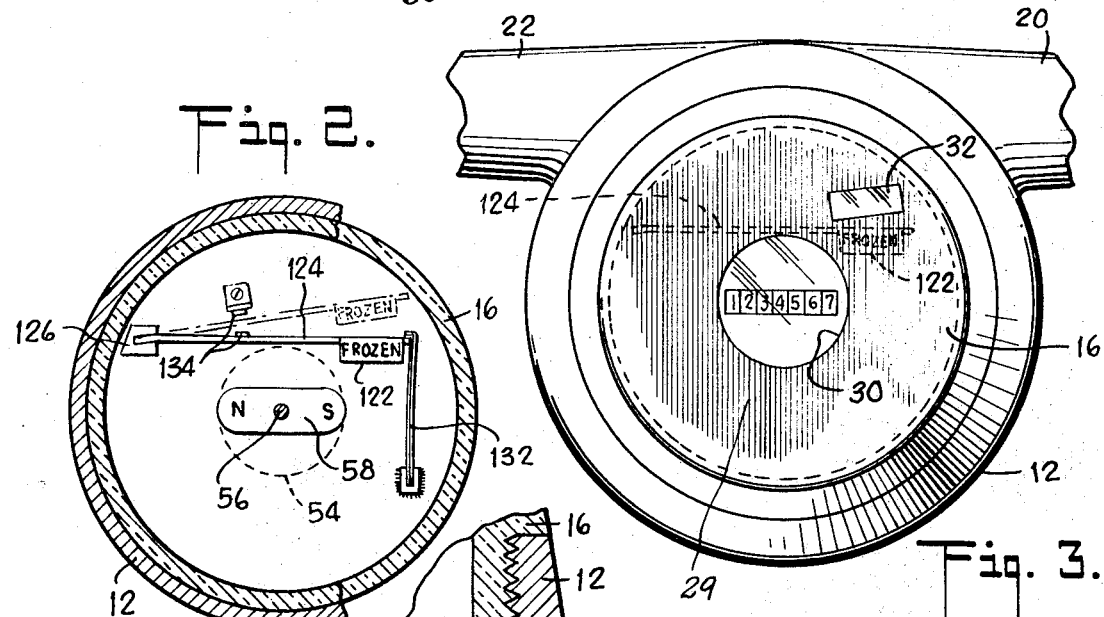
INVENTORS
RICHARD B. HOOK
KENNETH SOUTHALL
BY
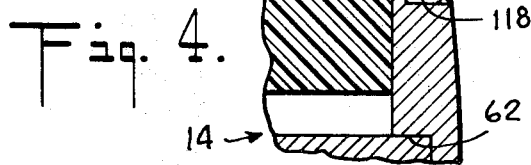
ATTORNEY

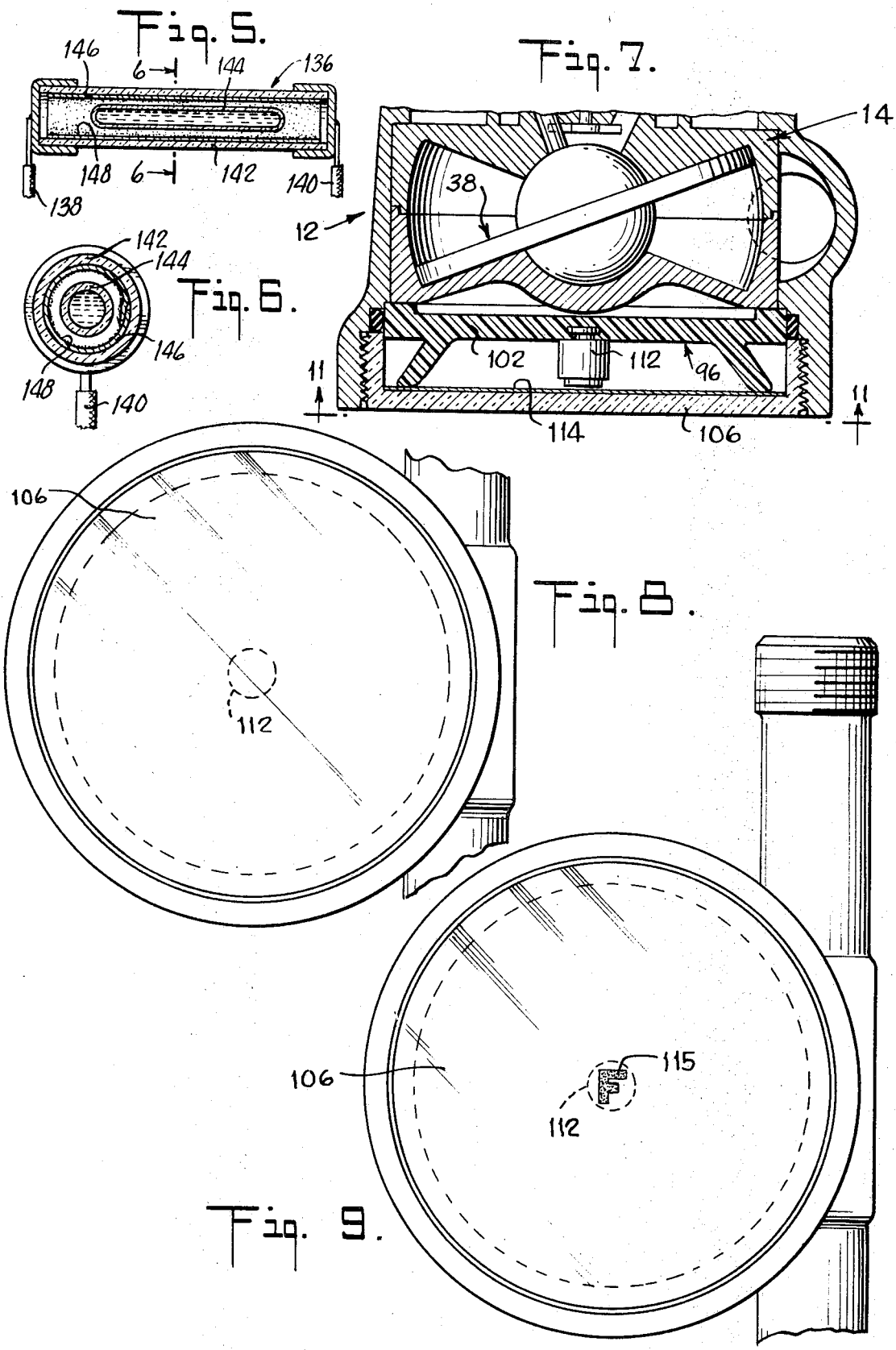

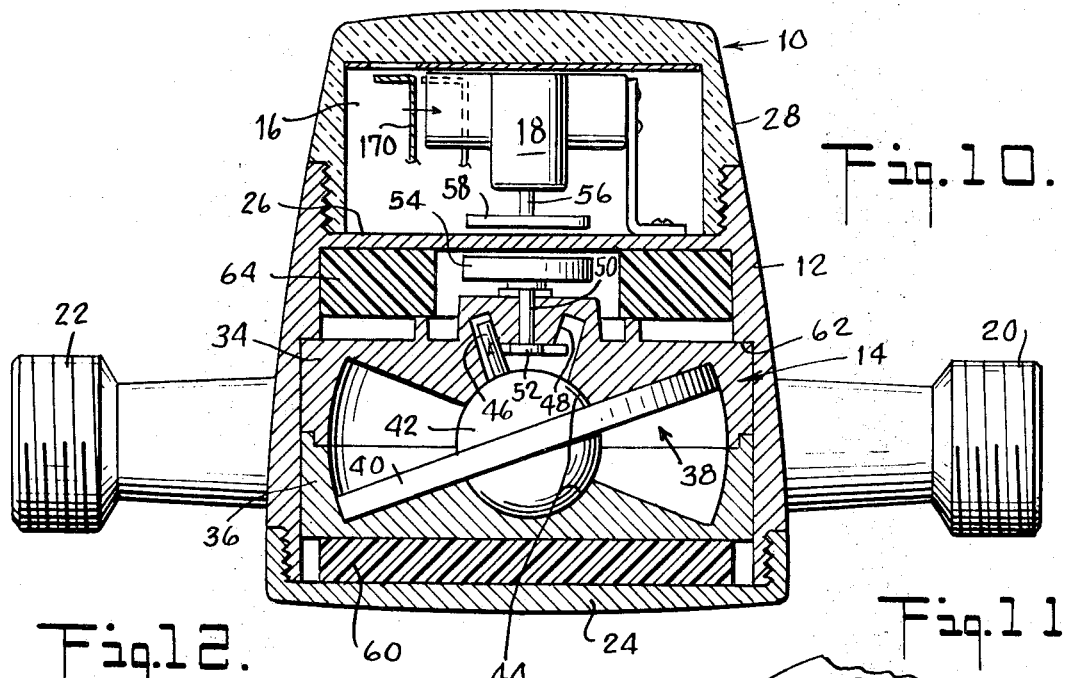

United States Patent Office 3,534,604
Patented Oct. 20, 1970

3,534,604
WATERMETER WITH FREEZE PROTECTION AND INDICATION
Richard B. Hook, Franklin Lakes, N.J., and Kenneth Southall, Wethersfield, Conn., assignors to Neptune Meter Company, New York, N.Y., a corporation of New Jersey
Filed Feb. 8, 1968, Ser. No. 704,023
Int. Cl. G01f 1/00
U.S. Cl. 73—277        1 Claim

ABSTRACT OF THE DISCLOSURE

Positive displacement flowmeter with nutating disc moving within two-part measuring chamber normally seated within an outer casing of strong, resilient material capable of withstanding pressures due to water expansion upon freezing. During freezing, such expansion may either separate the two-part measuring chamber or displace it from its seat within casing. Within the outer casing, there is also provided a space filled with compressible material, which may be air. Upon freezing and consequent movement of the measuring chamber parts, the compressible material is compressed to accommodate that movement, allowing the meter to freeze without breaking the outer casing. Spring means may be associated with the compressible materials, biasing the parts toward their normal operating positions.

Various signal devices, either local or remote, are provided for indicating that a meter has been frozen.

BACKGROUND OF THE INVENTION

Conventionally, the main case of watermeters has been provided with a frangible cast iron bottom plate. When meters so constructed are subjected to freezing, the cast iron bottom plate breaks and relieves the interior pressure caused by expansion of water due to freezing, and thereby protects the interior mechanism against damage.

At times, the first indication that such a meter has been frozen is the flooding caused by water leakage from a ruptured meter case following thawing. Under these conditions, not only would the meter register inaccurately or not at all, but the occupant of the metered property may be greatly inconvenienced by the leaking from the meter.

It has been proposed (e.g., in U.S. patents to Lambert 741,254, Tilden 651,617, and Van Gilder 1,718,803) to provide in a watermeter a spring or other yieldable structure which allows the meter parts to expand during freezing without breaking the outer case of the meter and causing leakage. The use of compressible material for a similar purpose has also been proposed, e.g., in Allen 3,137,167.

SUMMARY OF THE INVENTION

The present invention comprises a meter constructed so as to resist breaking upon freezing of water in the meter, combined with an indicator mechanism which displays a positive signal whenever the meter has been subjected to freezing temperatures, and retains that signal until manually reset.

The meter of the present invention is provided with a cylindrical measuring chamber which normally abuts against a shoulder in the outer case. The measuring chamber is formed of two separable parts and is contained in a cylindrical space in the outer case. Upon freezing of the water in the meter, either the two parts of the measuring chamber casing may be forced apart by the expansion of the water, or the measuring chamber may be forced away from the shoulder against which it normally is seated. Spring means or compressible means biases the two parts of the chamber together and also biases the chamber against its shoulder so that upon subsequent thawing, the meter parts should be restored to their normal positions.

There are illustrated several indicator mechanisms which are effective when the meter is frozen to produce an indication, visible either locally or remotely, that the meter has been frozen. The next meter reader or inspector who observes the meter or its remote indicator is thereby informed of the freezing. Proper steps can then be taken for internal inspection or replacement of the meter.

BRIEF DESCRIPTION OF THE DRAWINGS

FIG. 1 is a vertical, cross-sectional view of a watermeter including a freeze indicating mechanism, some parts shown in elevation;
FIG. 2 is a sectional view on line 2—2 of FIG. 1;
FIG. 3 is a plan view of the meter of FIG. 1;
FIG. 4 is a fragmentary vertical sectional view through a meter case showing an alternative form of freeze indicating mechanism;
FIG. 5 is a longitudinal sectional view through another alternative form of freeze indicating mechanism;
FIG. 6 is a transverse sectional view on line 6—6 of FIG. 5;
FIG. 7 is a cross-sectional view through a modified form of meter showing another alternative form of freeze indicating mechanism;
FIG. 8 is a bottom plan view of the meter of FIG. 7;
FIG. 9 is a view corresponding to that of FIG. 8 showing, however, the presence of a freezing signal;
FIG. 10 is a vertical, cross-sectional view of a watermeter similar to that of FIG. 1, but with a modified signal mechaism, some parts being shown in elevation;
FIG. 11 is a fragmentary plan view of the meter of FIG. 10;
FIG. 12 is a sectional view on line 12—12 of FIG. 11;
FIG. 13 is a sectional view taken on line 13—13 of FIG. 12;
FIG. 14 is a sectional view taken on line 14—14 of FIG. 13; and
FIG. 15 is a sectional view taken on line 15—15 of FIG. 13.

DETAILED DESCRIPTION

FIGS. 1-3

The meter of FIG. 1 has an outer main case consisting of a lower portion 12 enclosing a measuring chamber 14 and an upper portion 16. A register 18 and associated mechanism are housed in a register box defined by the lower and upper portions. Both portions of the case are preferably made of moldable plastic material, which may be either thermoplastic or thermosetting.

The bottom portion 12 of the main case has a meter inlet fitting 20 and a meter outlet fitting 22. The bottom of the meter is closed by a bottom cap 24 which has an internally threaded flange adapted to engage complementary external threads at the bottom of the main case 12. The cap 24 is also preferably of plastic material.

The register box is formed by a web 26 closing the upper end of the lower portion 12, and the upper portion 16, which is in the form of an inverted cup. Interengaging screw threads at the lower end of the upper section portion 16 and in an annular upstanding flange of the lower portion 12, above web 26, form a tight seal between the portions of the case.

The upper portion 16 may be formed completely of transparent material. A dial face 29 is located under the upper end of upper portion 16, and is provided with a register window 30 (FIG. 3) through which the register 18 may be viewed, and a flag window 32 where the presence of a freeze indicating flag 122 may be observed.

The measuring chamber 14 consists of an upper half 34 and a lower half 36 forming between them a space within which a disc piston 38 operates. The disc piston 38 consists of the usual nutating disc plate 40 mounted on a disc ball 42 which operates in spherical seats 44 formed in the respective upper and lower measuring chamber halves. A disc spindle 46 extends upwardly from the axis of the disc ball 42 and into contact with a head 48 shaped as an inverted truncated cone and forming a part of the upper measuring chamber half 34. Extending vertically through the upper wall of the upper chamber half 34 at the vertical axis of the conical head 48 is an output shaft 50. This shaft has a drive spider 52 fixed to its lower end and a drive magnet 54 fixed to its upper end. The drive magnet 54 is thereby disposed between the upper face of the upper half 34 of the measuring chamber and the lower face of the meter case web 26. The disc spindle 46 is in driving contact with th drive spider 52.

Extending downwardly from the register mechanism 18 is a register shaft 56 whose upper end has an operating connection with the mechanism of the register 18. The lower free end of the register shaft 56 has a driven magnet 58 attached thereto such that the latter overlies the drive magnet 54 and is influenced thereby as the latter is rotated.

Water entering the meter inlet 20 enters the measuring chamber 14 through an inlet opening (not shown) of conventional form, and drives the disc piston 38 with a nutating motion. The water leaves the measuring chamber 14 through a similarly conventional outlet opening communicating with meter outlet 22. The disc spindle 46 consequently rotates the output shaft 50 and its drive magnet 54. This causes the drive magnet 58 to rotate with the result that the register shaft 56 imparts an operating force to the mechanism of register 18 for registering the amount of water passing through the meter.

The main case 12, and the bottom cap 24 may both be made of a suitable plastic material, e.g., Lexan. When both the main case 12 and the bottom cap 24 are made of plastic, both parts will expand when water under pressure is supplied to the interior of the meter. With such materials, in order to ensure a tight connection between the case 12 and the cap 24, it is necessary that the case be provided with an external thread to cooperate with an internal thread on the cap 24. Then, the application of internal pressure simply makes the threaded connection tighter.

A yielding block 60 is interposed between the lower half 36 of the measuring chamber and the inner face of the bottom cap 24. The upper face of the measuring chamber abuts against an annular shoulder 62 formed in the main case 12. The yielding block 60 is preferably former of a closed cell foam plastic, such as polyethylene, or polypropylene. It can be seen, therefore, that if freezing water generates an expansion force within the measuring chamber 14, its lower half 36 may compress the yielding block 60 but the upper half 34 will not be able to rise by reason of its contact with the annular shoulder 62. Thus the two halves of the meter chamber may separate, increasing the volume within the chamber to accommodate the expansion of the water as it freezes. Another possible freezing condition is that the water above the measuring chamber may expand and force the whole chamber downwardly, which movement would also be accommodated by the compressible block 60. The yielding block 60 thereby protects the measuring chamber against damage due to the expansion of water during freezing.

The space occupied by water between the meter case web 26 and the upper face of the measuring chamber 14 is preferably minimized by the presence of a yielding annulus 64, suitably constructed of the same material as the yielding block 60. The yielding annulus 64 abuts against the meter case web 26 and rests upon an annular rib 66 formed in the uppper face of the measuring chamber. By minimizing the amount of free space between the measuring chamber and its encasing structure, the amount of water capable of collecting in these spaces is minimized with the consequence that smaller expanding forces will be generated if the water freezes.

The ideal construction, if possible, would be to have the block 60 formed of material having uniform and dependable self-restoring characteristics, so that after the block is compressed by freezing and decompressed by thawing, the uniform expansion during the thaw restores the parts of the meter to their proper operating position.

Nevertheless, because of the complexity of the structures involved (chamber halves 34, 36, piston 40, ball 42 and spindle 46) and because the meters commonly operate without freezing for many years, during which the restoring characteristics of the block 60 may change, it is probable that, after a cycle of freezing and thawing, some part or parts may be dislocated, so that the meter does not register accurately. This fact, indeed, compels an inspection of the interior of the meter after each freeze. To insure that such inspections are not overlooked, a positive and distinct signal must be given that the meter has frozen. Otherwise, the fact that freezing had taken place might go unnoticed. Several alternative signals for that purpose are illustrated in the drawings and described herein.

In FIGS. 1 through 3, the actuating mechanism of the freezing indicator is located in the upper portion 16 of the meter case. It consists of a warning flag 122 mounted at the free end of a spring arm 124 which is cantilevered at its opposite end in a post 126. The arm 124 is self-biased toward a position in which the flag 122 is aligned with window 32. The arm 124 is normally held in a non-indicating position against its self-bias by a bi-metallic latch arm 132, one end of which is fixed within the register box. The other end of the arm 132 has a flange which engages the tip of arm 124. The bi-metallic latch arm 132 is designed to flex and release the arm 124, when the temperature falls to the freezing point. The self-bias of the arm 124 then moves the sign "FROZEN" into alignment with the display window 32. At the same time, a pair of electrical contacts 134 are closed and establish an electrical circuit to an electrically operated signal device which may be either near the meter or at a remote point.

FIG. 4

An alternative form of signal means is illustrated in FIG. 4, where a cavity 116 has been formed in the wall of the meter case. This cavity is filled with a liquid 118 which freezes at the freezing temperature of water. A plug 120 is press-fittted into the open mouth of the cavity 116 and normally retains the liquid 118, but is dislodged by the expanding liquid as it freezes. The removal of the plug 120 provides an indication that the meter has been subjected to freezing temperature. If the liquid is colored, then, upon thawing, the liquid will stain the exterior of the meter case as a further indication that freezing had taken place.

FIGS. 5 AND 6

The alternative signal system of FIGS. 5 and 6 controls an electrical circuit and produces a visual signal, in response to exposure to a freezing temperature. In these figures, a signal cartridge 136, which may be mounted within the meter or adjacent thereto, is connected to a signal circuit through leads 138 and 140. The body 142 is preferably formed of glass or a similar transparent substance. Within the cartridge is a frangible capsule 144 containing a liquid which will freeze at the freezing temperature of water. This liquid is preferably colored. Indeed, it may also be a solution which will more readily conduct current when the capsule is broken upon freezing of its liquid. It is also contemplated that the capsule 144 will be surrounded by a paper envelope 146 which will stain upon contact by the liquid of the capsule and thus also providing a visual signal that the meter has frozen. Salt granules 148 may also be enclosed within the cartridge so that when the liquid of the capsule 144 is discharged into the envelope of the signal cartridge, a good conductor will be internally provided for the flow of current between the conductors 138 and 140. A circuit may thereby be established for operating an electrical signal device showing that the meter has been frozen.

Alternatively, the liquid may be placed in a multiplicity of microcapsules which rupture upon the occurrence of a freezing temperature.

FIGS. 7-9

The meter of the these figures employs a support member 96 having an integral spring structure 104, to hold the measuring chamber in place, in lieu of the compressible block 60 of FIG. 1. The indicator mechanism is associated with that support member. In FIG. 7, a meter case 95 and the measuring chamber 14 are shown. Support member 96 has been provided within the meter case 95. The meter case is open at the bottom, permitting the insertion of the measuring chamber into abutting relation with an internal shoulder 98. The support member 96 is seated within the open end of the meter case against a second shoulder 100 also formed in the meter case. The support member 96 comprises a central web 102 and a downwardly extending and outwardly flared, generally conical supporting pedestal 104 which rests on a bottom cap 106 when the latter is screw-threaded onto the open end of the meter case. An O-ring seal 107 is compressed between the cap 106, the case 95, and the support member 96, and is substantially effective to prevent leakage from the measuring chamber 14.

It should be noticed that the diameter of the bottom cap is large enough to allow the periphery of the support member 96 to move downwardly within the cap 196. Moreover, the lower extremity of the pedestal 104 is dimensioned to provide clearance between it and the upstanding flange of the bottom cap. The support member 96 may be formed of any suitable yielding material such as Lexan (the General Electric trademark for its thermoplastic polycarbonate resins), bronze, stainless steel, etc. If the meter is subjected to a freezing temperature, the chamber 14 may be forced down away from shoulder 98. Furthermore, the two halves of chamber 14 may separate due to expansion of the water in the chamber. The support member 96 will accommodate such expansion or movement of chamber 14 when the meter freezes, by spreading the flared pedestal 104. The materials just described have excellent self-recovery properties, and are almost always effective upon thawing of a frozen meter to restore the parts to their normal operating positions.

A signal stamp 112 is attached to the web 102, preferably being integrally molded therewith, and extending downwardly therefrom at the central vertical axis thereof. This stamp may have formed in the free face thereof some letter or device in relief which may be recognized as a signal that the meter has been frozen.

The bottom cap 106 has an overlay of pressure-sensitive paper 114 interposed between its inner face and the character on the free face of the signal stamp 112. Upon internal expansion caused by freezing, the web 102 of the support member 96 is driven outwardly with the result that the character on the signal stamp 112 will be impressed against the pressure-sensitive paper 114, thus registering the fact that the meter has been frozen. If the cap 109 is transparent, the indication on the paper 114 will be visible as shown at 115 in FIG. 12.

When the case 95 is formed of bronze, as is intended, and the cap 106 is formed of plastic, the plastic expands more readily than the bronze, and it is essential that the case 95 then have an internal thread which cooperates with an external thread on the periphery of the cap 106. This is in contrast to the arrangement of threads required in the casing of FIG. 1, where both the casing 12 and the cap 24 are made of plastic. Internal pressure from the water in the meter of FIG. 3 will force the flange of the cap against the bronze casing, thereby tightening the cap.

FIGS. 10-15

Those parts of the meter of FIG. 13 which are the same as their counterparts in FIG. 1 have been given the same reference numerals, and will not be further described.

The signal mechanism of FIGS. 10-15 is in the register box and includes a movable signal arm 170, shown in FIG. 13 in full lines in an non-indicating position, and a body of liquid, having a freezing temperature equal to that of water, and confined in a container 172, having at least one flexible wall 174 mounted with the flexible wall adjacent the arm 170. When the liquid in the container 172 freezes, it expands and distends the wall 174 and by physical contact moves the arm 170 from its non-indicating position to a signal producing position.

The container 172 may be formed of suitable plastic material and have a degree of inherent flexibility and resilience. The wall 174 may be reduced in thickness as compared with the rest of the container so that wall 174 expands more readily than other parts of the container when freezing occurs.

The container 172 is mounted on a bracket 176 which also supports the arm 170. The container 172 is inserted into an aperture in the bracket 176 until an integral external flange 178 on the container comes into contact with the face of the bracket and prevents further movement ot the container. Ready withdrawal of the container from the bracket is prevent by a push-on spring clip 180 inserted about the container from the rear face of the bracket.

The signal arm 170 at one of its ends is attached to the bracket 176 by a pair of screws 182 and 184, one of which may serve as the terminal for an electrical connector. The arm 170 at its free end has a flag 186 which, as shown in FIG. 11, is visible in the window 32 when the arm is moved to its signal producing position. An electrical contact 188 near the free end of the arm 170 is adapted to engage a fixed electrical contact 190 carried by a contact strap 92 which is insulatingly mounted on the bracket 176. A terminal screw 194 permits the contact 90 to be connected into an electrical circuit adapted to control another signal, which may be located at a point remote from the meter.

A latch device 196 is attached to the bracket 176 and extends forwardly therefrom to hold the arm 170 in its operated position until manually released. The latch device 196 comprises a spring clip having a keeper groove 197 therein in which the arm 170 is engaged when operated into signal producing position.

It can, therefore, be seen that there has been provided a freeze signal system for watermeters which is not only adapted to produce a visual signal at the meter when freezing occurs, but also one which may concurrently control an electrical circuit to a remotely located signal. Moreover, the latching mechanism for the signal arm requires the positive attention of an attendant to restore the system to normal operating condition. This latching mechanism ensures that the indication that the meter has been frozen continues until the mechanism is reset during a subsequent inspection of the meter.

In all of the embodiments of the invention, the main case 12, 16 and the cap 28 are formed of materials which are sufficiently strong and elastic to withstand expansion of the water in the meter upon freezing, without rupturing. In all of the meters disclosed, it is intended that there be, within the main case of the meter, a space filled with air (which is, of course, compressible) or other compressible material, and that the expansion due to freezing be accommodated either by compressing air or the other material. Nevertheless, it is desirable to open and inspect internally any meter which has gone through such a cycle. The various signal mechanisms disclosed herein are effective to indicate to a meter reader or other observer that a meter has been frozen, so that the necessity of an inspection will not be overlooked because of the apparent continuing integrity of the main case of the meter.

While the novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claim.

We claim:
1. A watermeter comprising:
   (a) a main case;
   (b) a measuring chamber in said main case having at least two separable parts;
   (c) yieldable means disposed between one part of the chamber and the main case and effective to hold said one part in operative engagement with another part of the chamber, said yieldable means being capable of compression to accommodate the expansion of freezing water in the meter;
   (d) signal means shiftable between a normal condition and a condition indicating that the meter has been subjected to a freezing temperature, and operable to said indicating condition in response to the temperature at the meter;
said watermeter being improved in that:
   (e) said yieldable means comprises:
      (1) a web of flexible material extending transversely of the main case and engaging said one part of the chamber;
      (2) an annular pedestal of flexible material extending diagonally from the opposite side of said web; and
      (3) said web and said pedestal being deformable to accommodate the expansion of freezing water in the meter;
   (f) said main case comprises cap means engaging the end of said pedestal opposite the web; and
   (g) said signal means comprises:
      (1) an indicia bearing member on the web and projecting toward said cap means;
      (2) said cap means has at least a portion thereof transparent and aligned with said indicia bearing member; and
      (3) a sheet of pressure sensitive material between the cap means and the indicia bearing member and effective when compressed between said cap means and the indicia bearing member to change its visual appearance.

References Cited
UNITED STATES PATENTS

| | | | |
|---|---|---|---|
| 651,617 | 6/1900 | Tilden | 73—277 |
| 741,254 | 10/1903 | Lambert | 73—277 |
| 2,299,991 | 10/1942 | Kallock | 346—135 |
| 3,440,879 | 4/1969 | Frayssinoux | 73—277 |
| 3,452,706 | 7/1969 | Vogt | 73—378.3 |

RICHARD C. QUEISSER, Primary Examiner

A. E. KORKOSZ, Assistant Examiner